United States Patent [19]

Roushdy

[11] 4,274,305
[45] Jun. 23, 1981

[54] TRANSMISSION THROTTLE VALVE ACTUATOR FOR AN AUTOMATIC TRANSMISSION

[75] Inventor: Hesham A. Roushdy, Birmingham, Mich.

[73] Assignee: Ford Motor Company, Dearborn, Mich.

[21] Appl. No.: 28,132

[22] Filed: Apr. 9, 1979

[51] Int. Cl.³ .................. B60K 41/06; G05G 1/00
[52] U.S. Cl. ........................ 74/865; 74/470; 74/513
[58] Field of Search ............... 74/470, 513, 865, 869

[56] References Cited

U.S. PATENT DOCUMENTS

| 1,304,955 | 5/1919 | Fowler | 74/470 X |
|---|---|---|---|
| 2,575,901 | 11/1951 | Wheeler | 74/470 X |
| 2,638,082 | 5/1953 | Dillard | 74/470 X |
| 2,799,181 | 7/1957 | Speckman | 74/470 X |
| 2,823,555 | 2/1958 | Cislo | 74/470 X |
| 3,183,879 | 5/1965 | Heidner | 74/470 X |
| 3,633,435 | 1/1972 | Farr | 74/470 |
| 3,731,663 | 5/1973 | Hollins | 74/513 X |
| 3,805,676 | 4/1974 | Hamma et al. | 74/843 |
| 3,913,418 | 10/1975 | Miyao et al. | 74/865 X |
| 3,952,614 | 4/1976 | Iijima | 74/865 |
| 4,016,842 | 4/1977 | Kittler | 74/513 X |
| 4,052,910 | 10/1977 | Olt, Jr. et al. | 74/470 X |
| 4,091,690 | 5/1978 | Miyao | 74/865 |
| 4,094,281 | 6/1978 | Kittler | 74/513 X |
| 4,117,809 | 10/1978 | Kittler | 74/513 X |

FOREIGN PATENT DOCUMENTS 412338  7/1910  France ........................ 74/470

Primary Examiner—Leslie Braun
Attorney, Agent, or Firm—Donald J. Harrington; Keith L. Zerschling

[57] ABSTRACT

A throttle valve system having a pressure modulator valve in an automatic control valve system for an automatic transmission for use with a throttle controlled internal combustion engine, said throttle valve system comprising a mechanical connection between a throttle valve pressure modulator element and an air-fuel mixture carburetor valve whereby provision is made for establishing a motion transmitting connection between the throttle valve and the carburetor valve to provide an initial increase in the modulated throttle valve pressure and to provide subsequent pressure increases as the engine throttle valve is advanced toward a wide open setting, the effort required to move the carburetor throttle valve through intermediate and advanced settings being determined by a preloaded torsion spring between motion transmitting members of the linkage.

2 Claims, 2 Drawing Figures

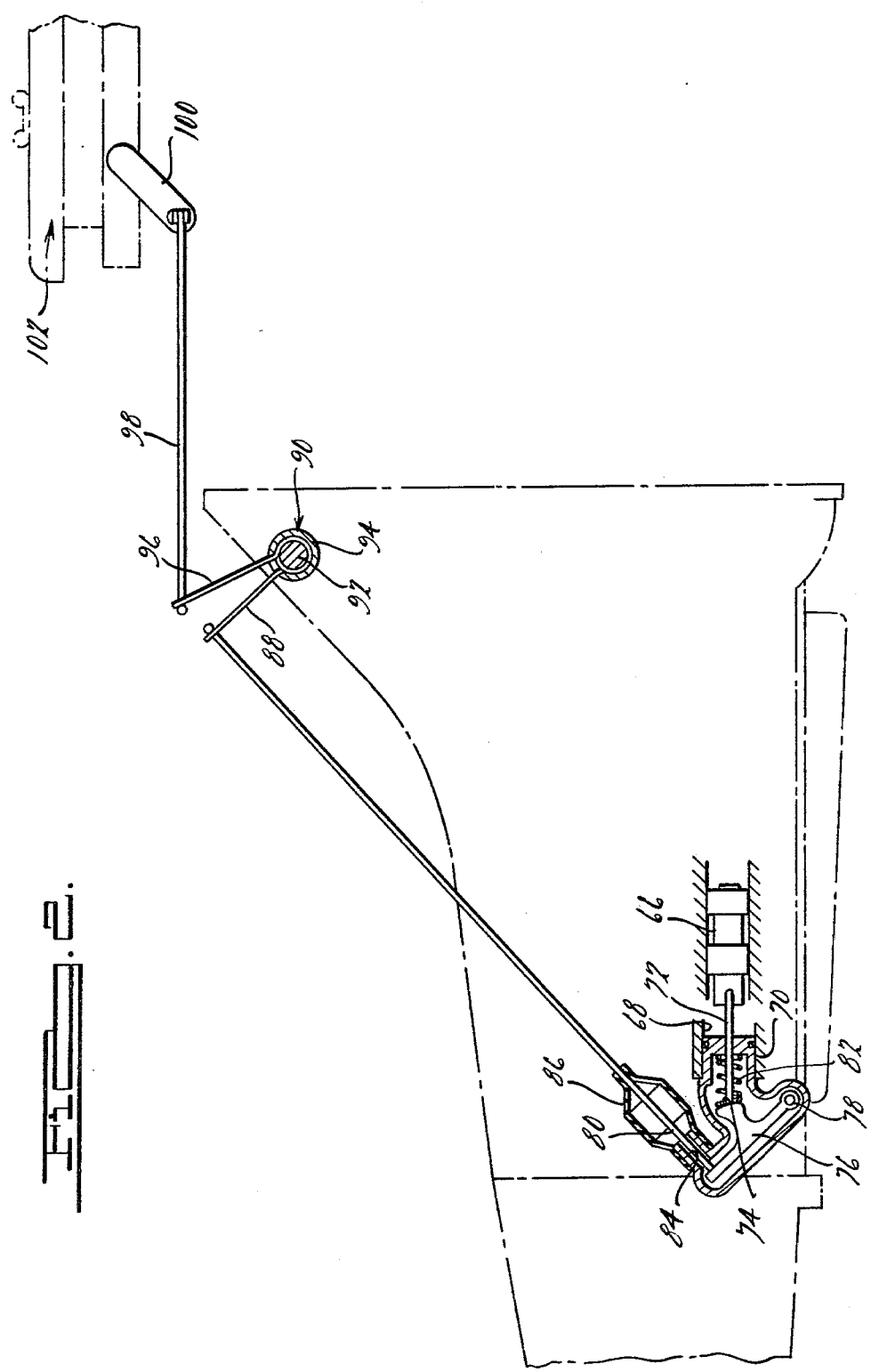

TRANSMISSION THROTTLE VALVE ACTUATOR FOR AN AUTOMATIC TRANSMISSION

BRIEF DESCRIPTION OF THE INVENTION

My invention comprises improvements in a throttle valve system for an automatic control valve circuit in an automatic transmission of the kind disclosed in U.S. Pat. No. 3,400,612. Control valve circuits of that kind comprise a pressure source such as an engine driven pump, automatic clutch-and-brake servos for controlling the relative motion of the gear elements of the transmission and passage structure connecting the pressure source with the servos. The passage structure includes a valve for selectively activating the servos to provide a shift sequence thus establishing multiple forward driving ratios. The valves respond to a torque demand pressure signal and a vehicle speed signal. The torque demand signal is obtained by connecting through a mechanical linkage the engine carburetor throttle valve and the movable valve element of a throttle pressure modulator valve assembly in the automatic transmission valve circuit. In this way the modlated output pressure of the transmission throttle valve is related proportionately to the carburetor throttle opening. The carburetor throttle opening in turn is an approximate indicator of the engine torque. Examples of prior art throttle valve linkages are shown in U.S. Pat. Nos. 3,738,197; 3,757,612; 3,048,055, 2,903,910; 3,805,676 and 3,765.273.

In some transmission systems, such as the one shown in U.S. Pat. No. 3,400,612, the transmission throttle valve is actuated by an engine manifold vacuum servo which is connected pneumatically to the engine intake manifold. No mechanical linkage is used between the transmission throttle valve and the carburetor throttle valve. The improvements of my invention do not apply to a throttle valve system of that kind.

One of the disadvantages found in a linkage type throttle valve system, as distinct from a pneumatic type throttle valve system, is the relatively high force necessary to actuate the carburetor throttle and the transmission throttle valve. The carburetor throttle valve is connected to the accelerator pedal and the vehicle passenger compartment. The pedal effort that is tolerable often requires a valve movement that is accompanied by a relatively large force increase, which is transmitted to the accelerator pedal. In my improved invention the optimum force can be distributed to the transmission throttle valve without affecting the travel of the linkage portions that are connected directly to the throttle valve. Thus a threshold for the transmission throttle valve pressure is reached. Further increases in throttle valve pressure upon an advancement of the carburetor throttle position occur as the carburetor is advanced toward a wide open position. Sufficient travel of the carburetor throttle and the accelerator pedal in the passenger compartment then may take place thus avoiding an excessive pedal effort. The optimum travel of the carburetor throttle linkage elements and the optimum force on the linkage elements that operate the transmission throttle valve can be achieved, and one does not depend directly upon the other.

According to my invention the engine carburetor throttle valve linkage elements and the transmission throttle valve linkage elements are connected by means of a torsion spring so that the former may move relative to the latter while the force transmitted from one to the other can take place. Thus the proper travel and force for the engine carburetor throttle valve linkage can be obtained without upsetting the optimum force-travel relationship that is necessary for the transmission throttle valve. A design compromise in this respect need not be made.

BRIEF DESCRIPTION OF THE FIGURES OF THE DRAWINGS

FIG. 2 is a schematic illustration of a transmission throttle valve and carburetor throttle valve actuator embodying the improvement of my invention.

PARTICULAR DESCRIPTION OF THE INVENTION

Figure 1:
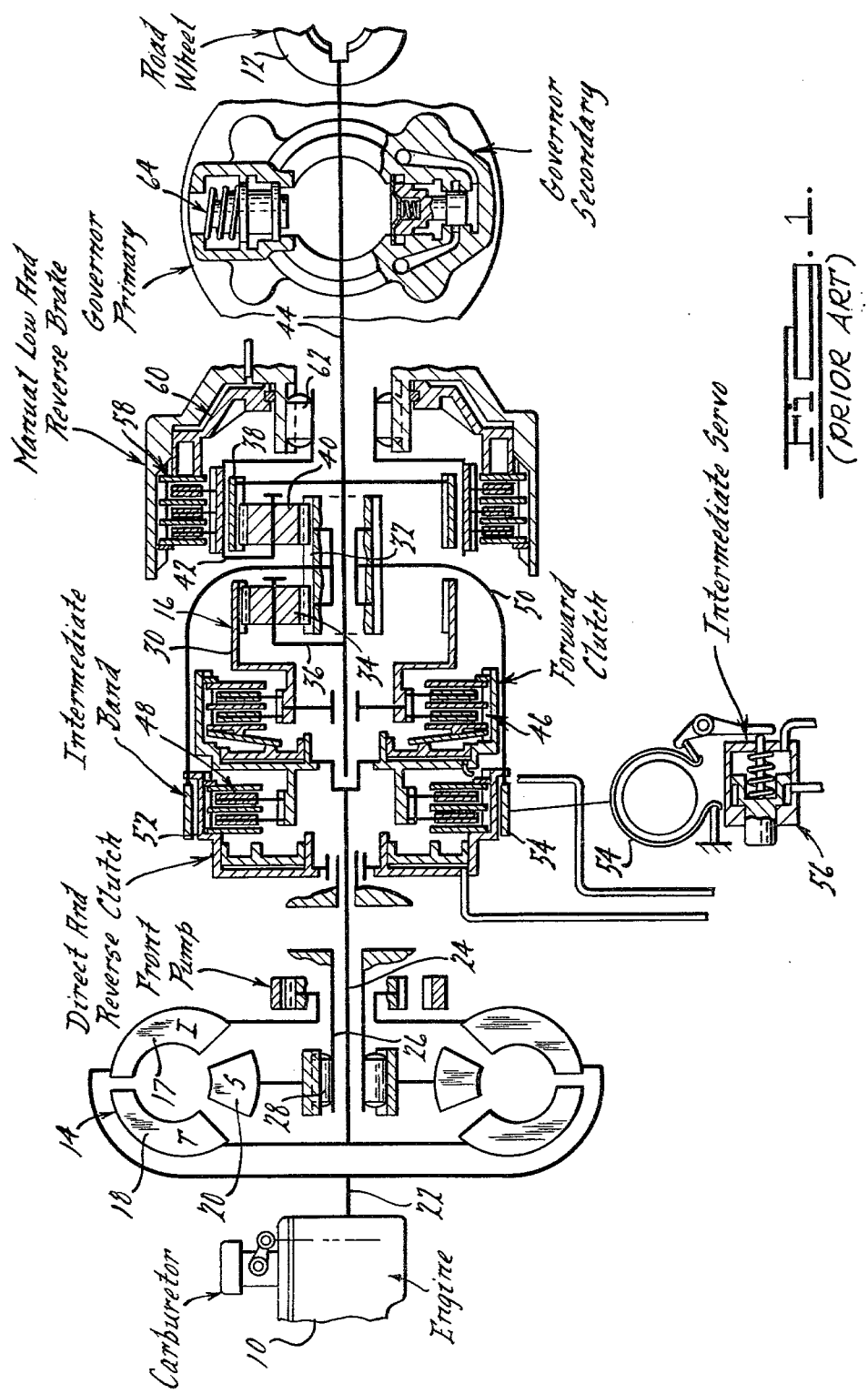
FIG. 1 shows in schematic form a power transmission mechanism for an automotive vehicle which includes a control valve system having a throttle valve linkage arrangement capable of using my invention.

In FIG. 1 numeral 10 designates an internal combustion engine for an automotive vehicle, and numeral 12 designates the traction road wheels. Torque is delivered from the engine to the road wheels through a transmission mechanism that includes a hydrokinetic torque converter 14 and a multiple ratio gear system 16.

The hydrokinetic torque converter 14 includes a bladed impeller 16, a bladed turbine 18 and a bladed stator 20. The impeller, the turbine and the stator are arranged in known fashion in a toroidal fluid circuit and the impeller is connected drivably to the crankshaft 22 of the internal combustion engine 10.

The turbine 18 is connected to the turbine shaft 24 which serves as a torque input shaft for the multiple ratio power transmission. The stator is supported by a stator sleeve shaft 26. An overrunning brake 28 anchors the stator against the shaft 26 to prevent rotation in a direction opposite to the direction of rotation of the impeller, but which permits freewheeling motion of the stator in the other direction.

The gear system 16 includes a simple planetary gear unit having a ring gear 30, sun gear 32 and planet pinions 34. A carrier 36 supports the pinions 34 so that they mesh with the ring gear 30 and the sun gear 32. The gear system 16 includes also a second planetary gear unit that comprises ring gear 38 and planet pinions 40. Sun gear 32 is common to both of the simple planetary gear units. Carrier 42 rotatably supports the pinions 40 so that they engage the ring gear 38 and the sun gear 32. Carrier 36 and ring gear 38 are connected drivably to power output shaft 44.

A forward drive clutch 46 is adapted to connect selectively the turbine shaft 24 to the ring gear 30. Clutch 46 is engaged during operation in each of the forward driving speed ratios for the gear system. A second selectively engageable friction clutch 48 is adapted to connect the turbine shaft 24 to a torque transfer member 50 which in turn is connected to the sun gear 32. Clutch 48 is engaged to condition the gear system for operation in the direct driving ratio and to effect reverse drive operation.

Clutch 48 is defined in part by a brake drum 52 which is encircled by brake band 54. The brake band is operated by a fluid pressure operated servo 56. When brake band 54 is applied, sun gear 32 becomes anchored so that it acts as a reaction point during intermediate speed ratio operation.

The carrier 42 is adapted to be braked by a low-and-reverse brake 58, which in the embodiment shown is a disc brake operated by a fluid pressure operated servo 60. An overrunning brake 62 also is provided in the gear system to anchor the carrier 42 against rotation during low speed ratio operation when the manual low-and-reverse brake 58 is not applied.

A compound governor valve assembly 64 is carried by the output shaft 44. Valve assembly 64 produces a governor pressure signal that is used by the control valve circuit to establish ratio changes. Output shaft 44 is connected to the traction wheels 12 through a driveline and differential mechanism, not shown.

A control valve system capable of actuating the servos for the clutches and the brakes of the mechanism in FIG. 1 may be similar to the valve system shown in U.S. Pat. Nos. 3,424,037 and 3,393,585 except that in those valve systems the throttle valve is used to establish a torque signal of the pneumatic type which responds to engine intake manifold pressure. In other respects a valve system similar to those shown in these reference patents may be used. The throttle valve that would form a part of the throttle valve system is shown in FIG. 2. It includes a modulating valve element 66, slidably positioned in a valve chamber 68. A stationary valve body closure 70 is positioned in the valve chamber 68. An actuator rod 72 is slidably positioned in a central aperture formed in the closure 70, the right hand end of which engages the valve element 66 and the left hand end of which engages cam surface 74 formed on cam lever 76. Lever 76 is pivoted at 78 on the closure 70. The end of the cam lever 76 is connected to one end of a transmission throttle linkage element 80.

The cam lever 76 is enclosed within the closure member 70. The cam surface 74 is located intermediate the ends of the lever 76 and is engaged by compression spring 82, which is seated on the closures 70.

The linkage element 80 extends through an opening 84 in the closure 70 and a flexible boot 86 surrounds the opening 84 and the link 80 to prevent entry of dirt, moisture and other contaminants into the valve operating mechanism.

The other end of the link 80 is connected to one arm 88 of a torsion spring 90. Torsion spring 90 surrounds a mounting shaft 92 and is located within a sleeve 94 through which the arm 88 extends. Another arm 96 located at the other end of the tension spring 90 also extends through the sleeve and is connected to a second linkage element 98. That element is connected to a carburetor throttle valve operating lever 100 which forms a part of a carburetor indicated generally by reference character 102.

The torsion spring 90 is preloaded to provide an initial force on each of the linkage elements 80 and 98. As soon as linkage element 98 moves upon adjustment of the engine carburetor throttle a spring 90 will produce a force in the linkage element 80, which will be magnified by means of the cam lever 76 to produce a force on the throttle valve element 66 that is proportional to the engine throttle position, thereby generating a transmission throttle valve pressure signal that is proportional to the engine torque, thus providing a means for effecting line pressure control in the transmission system as well as a shift signal for the transmission shift valve.

The force that is transmitted to the transmission throttle valve element 66 is determined by the spring characteristics of the preloaded torsion spring 90. An additional design variable thus is introduced so that the transmission throttle valve system can be calibrated independently of the calibration of the carburetor throttle valve. The force applied to the transmission throttle valve element is not dependent solely upon the movement of the carburetor throttle valve. Calibration of the transmission throttle valve then can be tailored to meet the requirements of the transmission throttle valve while the relationship between the force on the accelerator pedal and the travel of the throttle valve can be calibrated to give optimum pedal travel and effort.

Having described a preferred embodiment of my invention, what I claim and desire to secure by U.S. Letters Patent is:

1. A mechanical linkage system for operating a transmission throttle valve and an automatic control valve circuit for an automatic transmission in an automotive vehicle driveline that includes an internal combustion engine with a carburetor throttle, said linkage comprising a first linkage element adapted to be connected mechanically to the engine carburetor throttle at one end, a force multiplying lever actuator means for moving the transmission throttle valve, a second linkage element having one end thereof connected to said actuator, a preloaded torsion spring connecting the other end of said first linkage element with the other end of the second linkage element whereby an initial throttle valve actuating force is applied to the transmission throttle valve upon initial movement of the carburetor throttle and wherein an increase in the magnitude of the force applied to said transmission throttle valve is accompanied by flexure of said torsion spring which permits independent movement of said first linkage element with respect to said second linkage element, said torsion spring comprising a coiled spring mounted on a stationary portion of said transmission mechanism and having lever arms extending from each side of said spring, one arm being connected to said other end of said linkage element and the other arm being connected to the other end of said first linkage element.

2. The combination as set forth in claim 1 wherein said actuator comprises a lever mounted at one end thereof on a stationary portion of said transmission mechanism, the other end of said lever being connected to said one end of said linkage element, an intermediate portion of said actuator lever being connected mechanically to said transmission throttle valve, and spring means for opposing movement of said actuator toward a transmission throttle valve actuating position.

* * * * *